June 20, 1967
H. W. MURRAY
3,326,572
DETACHABLE GOOSE NECK TRAILER
Filed Aug. 2, 1965
3 Sheets-Sheet 1
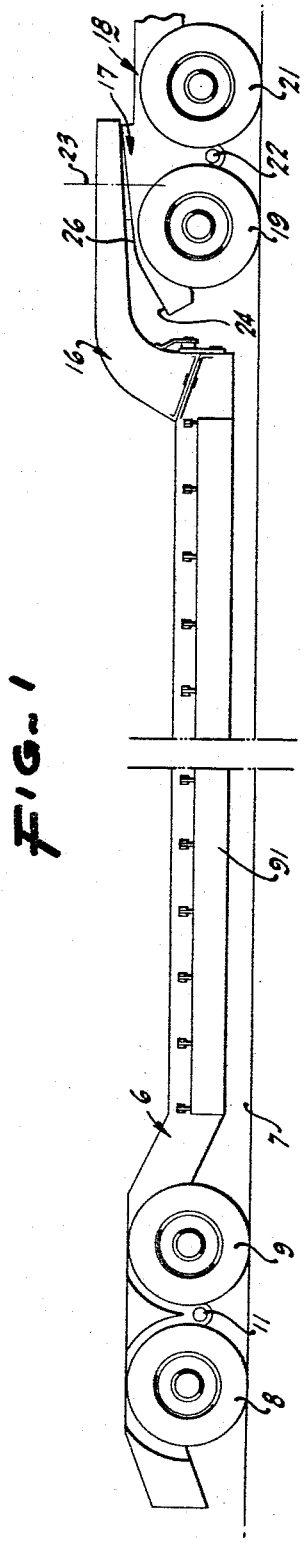
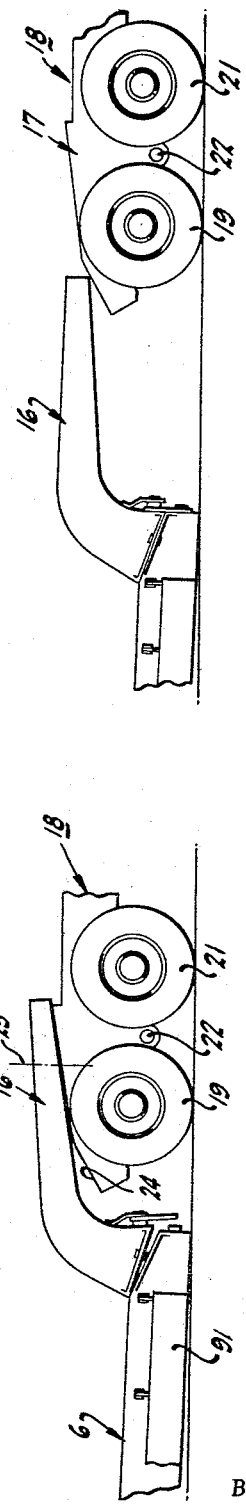
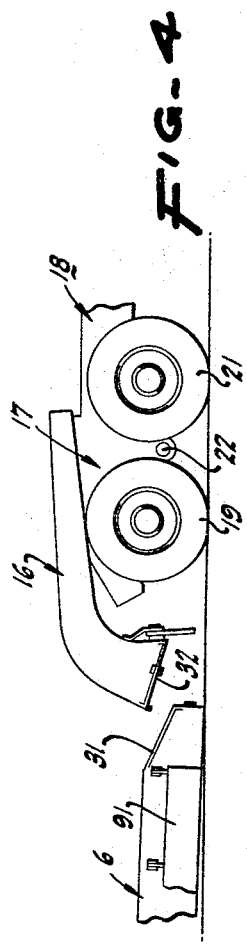
INVENTOR.
HARLEY W. MURRAY
BY Mason Lothrop
ATTORNEY

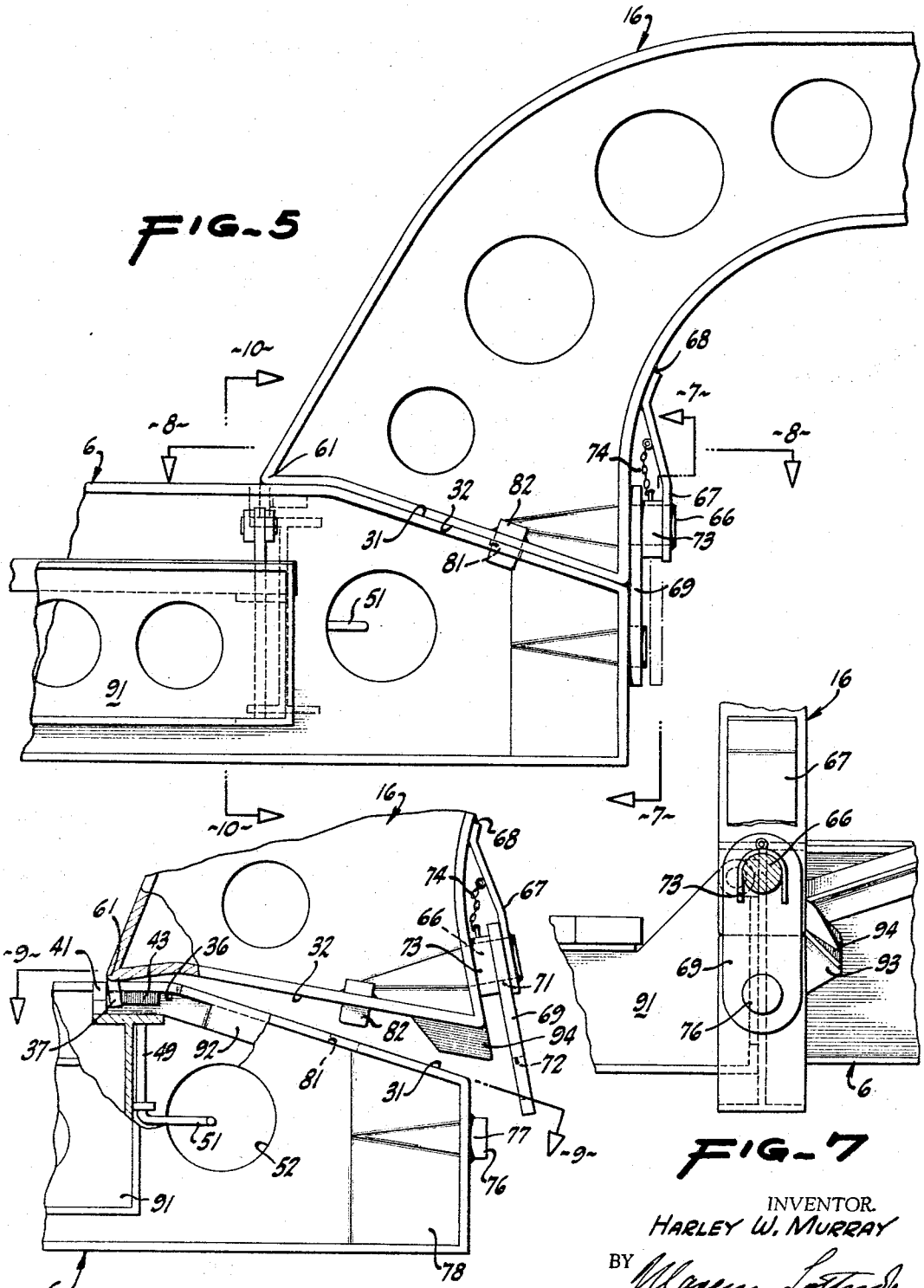

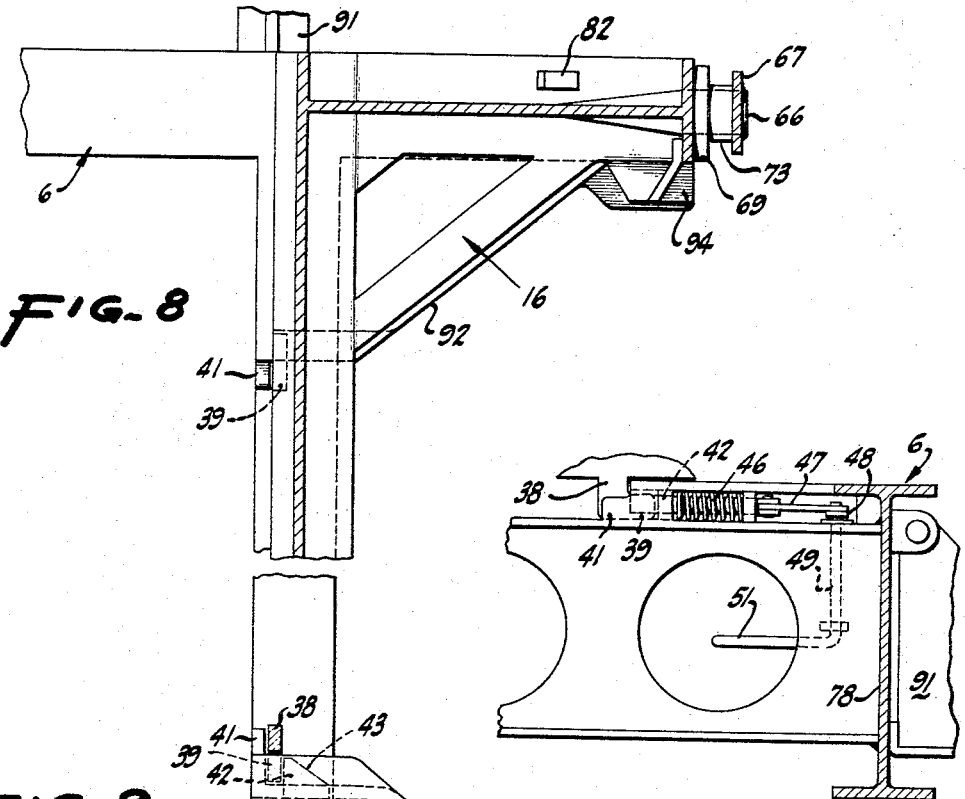
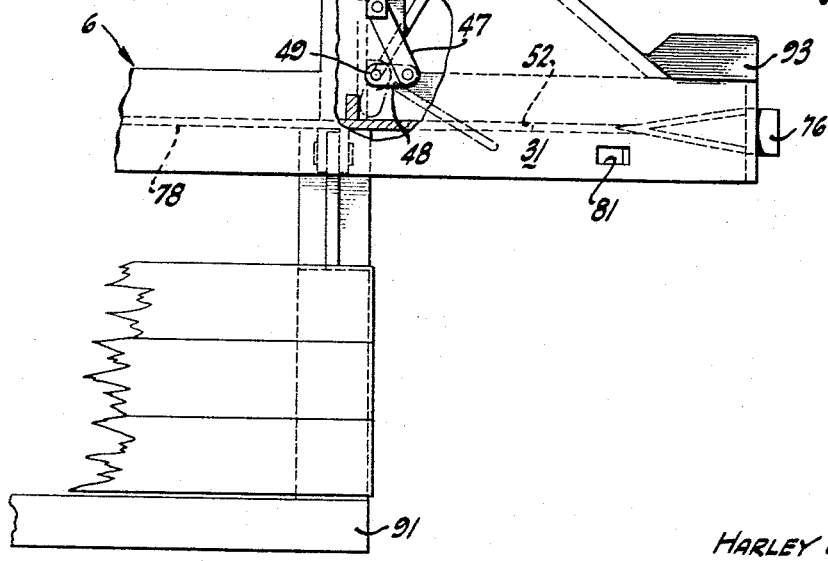

United States Patent Office
3,326,572
Patented June 20, 1967

3,326,572
DETACHABLE GOOSE NECK TRAILER
Harley W. Murray, 1754 E. Mariposa Road,
Stockton, Calif. 95206
Filed Aug. 2, 1965, Ser. No. 476,488
4 Claims. (Cl. 280—423)

ABSTRACT OF THE DISCLOSURE

A detachable goose neck frame and trailer frame have upwardly and rearwardly inclined surfaces adapted to abut when the goose neck frame and trailer frame are connected. Pins are arranged on the goose neck frame to extend longitudinally. Links depending from and slidable along those pins can be slid rearwardly, when the inclined surfaces abut, from a disengaged forward position to a rearward position in supporting engagement with other pins extending longitudinally from the trailer frame.

My invention relates to wheeled vehicles and is especially concerned with a vehicle having two principal parts that can be connected together for operation as a unitary vehicle and that can be detached from each other for various uses, particularly for assisting in loading and unloading articles for transportation.

In moving various heavy and bulky loads such as excavating machinery, trees for transplanting, tractors and the like from place to place over the highway or even off the highway at substantial speed, it is helpful to employ a trailer having pneumatic tires and a sizeable and sturdy frame. Usually the trailer incorporates an arched forward portion or goose neck which rests upon and is at least temporarily joined to the fifth wheel of a pneumatic-tired tractor. For various reasons, particularly the size of the customary tractor and the size of the ground-engaging tires, the trailer frame is a substantial distance above the ground. This requires a corresponding lifting or loading arrangement to elevate the lading into transport position on the trailer and to unload the lading at its destination. Usually this is a complex and costly operation that must be accomplished twice for each load.

It is therefore an object of my invention to provide a detachable goose neck trailer which reduces substantially the customary loading and unloading chores.

Another object of my invention is to provide a detachable goose neck trailer, the two main portions of which are quite easily connected together and taken apart.

Another object of my invention is to provide a detachable goose neck trailer in which the two principal parts when connected together are capable of sustaining the maximum lading and are securely held in position for transport.

A further object of my invention is to provide a detachable goose neck trailer having surfaces or configurations effective to transmit forces due to the lading and to the transportation between the separate parts thereof.

A still further object of my invention is to provide a generally improved detachable goose neck trailer.

Other objects, together with the foregoing, are attained in the embodiment of my invention described in the accompanying description and illustrated in the accompanying drawings, in which:

FIGURE 1 is a side elevation of a detachable goose neck trailer according to my invention, a portion of the main frame being broken away to reduce the size of the figure and only the rearward portion of a standard tractor being shown;

FIGURE 2 is a side elevation similar to FIGURE 1 but showing the tractor virtually disengaged from the trailer and the forward portion of the trailer main frame on the ground, parts being broken away to reduce the size of the figure;

FIGURE 3 is a side elevation similar to FIGURE 2 but showing the goose neck frame in a pivoted position with respect to the main frame and in engagement with the tractor;

FIGURE 4 is a side elevation similar to FIGURE 3 but showing the goose neck frame entirely separated from the main frame and in engagement with the tractor;

FIGURE 5 is a side elevation to an enlarged scale and with portions broken away showing the interconnecting portions of the main frame and of the goose neck frame in connected relationship;

FIGURE 6 is a view similar to FIGURE 5 showing the goose neck frame in a position pivoted with respect to the main frame;

FIGURE 7 is an end elevational view, partly in cross section, the plane of which is indicated by the lines 7—7 of FIGURE 5;

FIGURE 8 is a cross section, the plane of which is indicated by the line 8—8 of FIGURE 5, which shows one side of the symmetrical main frame;

FIGURE 9 is a cross section, the planes of which are indicated by the lines 9—9 of FIGURE 6, which shows the other side of the symmetrical main frame; and FIGURE 10 is a cross section, the plane of which is indicated by the line 10—10 of FIGURE 5.

The detachable goose neck trailer pursuant to the invention can be embodied in a number of different practical forms, but has successfully been commercially embodied as shown herein. In this arrangement, the device includes two major parts, one of which is a main frame 6. This extends longitudinally in the direction of advance of the vehicle and, like the remaining parts of the structure, is almost entirely symmetrical about a longitudinal central plane. For that reason, the description herein should be understood to apply to both sides of the vehicle whether or not specifically referred to.

The main frame 6 is comprised of the usual structural members and adjacent its rearward end is supported from the ground 7 by a number of ground-engaging wheels 8 and 9 joined by a suitable suspension 11 to the structural members of the main frame 6. The details of the suspension system are not of moment, but it is of interest that the main frame 6 when normally supported is substantially parallel to the ground 7 as shown in FIGURE 1. In accordance with the invention, the main frame can be positioned so that it is inclined forwardly and downwardly with respect to the ground with the forward end of the main frame actually resting on the ground; for example, as shown in FIGURE 2. The suspension 11 is capable of accommodating the various positions of the main frame so that in effect the main frame 6 can swing between a substantially horizontal position and a forwardly and downwardly inclined position.

Also included in the detachable goose neck trailer mechanism is a goose neck frame 16 similar to the main frame 6 in that it is likewise symmetrical about a vertical, longitudinal, central plane and is made up of the usual structural members. The goose neck frame 16 is also supported from the ground, but indirectly. At its forward end the goose neck frame is designed to cooperate with and upon occasion to interlock with the fifth wheel mechanism 17 of a tractor 18. The tractor is of any standard, automotive type and is not described in detail since its construction is well known. The tractor does include a number of ground-engaging driving wheels 19 and 21 related to the tractor frame through a suspension mechanism 22. The interrelationship between the tractor 18 and the goose neck frame 16 is such that the tractor can rotate about a vertical axis 23 with respect to the goose neck frame, and when interrelated therewith the pivot connection is firm. When the fifth wheel mechanism is detached and disconnected, the tractor 18 can be driven apart from the goose neck frame 16.

In accordance with usual practice, the tractor 18 adjacent to or as part of the fifth wheel mechanism 17 is provided with slanted support surfaces 24 and 26 of different inclinations, both of them extending downwardly and rearwardly with respect to the ground 7.

Means are provided particularly in accordance with the invention for interrelating and interconnecting the goose neck frame 16 and the main frame 6. For this reason, the main frame in its forward portion is provided with a downwardly and forwardly inclined abutting surface 31 (there being such surfaces at either side of the center) and these surfaces are so disposed as to abut, under appropriate circumstances, comparable rearwardly and upwardly or forwardly and downwardly inclined abutting surfaces 32 on the goose neck frame 16. The arrangement is such that the surface 31 is upwardly exposed and the surface 32 is downwardly exposed so that when the surfaces are brought into immediate contact, they form a continuity between the main frame 6 and the goose neck frame 16.

The main frame adjacent the rearward portion of the inclined abutting surface 31 is provided with a socket 36 into which a lug 37 depending from the rearmost portion of the goose neck frame 16 can enter. The arrangement is such, particularly as shown in FIGURES 6 and 10, that the lug 37, as seen looking forwardly in FIGURE 10, not only has a depending neck 38 but likewise has a laterally extending tab 39 making the lug L-shaped. The lug is intended to abut against a transversely extending stop wall 41 upstanding from the main frame.

The tab 39 is confined from time to time by a transversely extending latch bar 42 having a bevelled forward face 43. The latch bar 42 is designed to reciprocate transversely in a supporting web 44 and is normally projected by a coil spring 46. A link 47 pivoted to the latch bar and also pivoted to a crank 48 on a vertical crank shaft 49 allows for manual reciprocation of the latch bolt. A handle 51 accessible through an opening 52 in the side of the main frame permits the latch bar to be retracted and held in over-center position with the spring 46 cocked. When the handle 51 is rotated counterclockwise, as seen in FIGURE 9, the latch bar is released with the crank 48 then substantially off center. The lug tab 39 in moving rearwardly toward the stop wall 41 depresses the latch bar 42 by camming against the inclined face 43 thereof. Following this, the spring 46 again projects the latch bar to lie in the path of the tab 39. The goose neck frame and the main frame are thus latched together in unified position and are held against both fore and aft motion and against transverse or lateral motion.

The construction is such in the region of the pair of latch bars 42 that the goose neck frame and the main frame can substantially pivot with respect to each other about a transverse horizontal axis. For that reason, the inclined abutting surface 31 merges with a relatively flat surface on the upper side of the main frame in the vicinity of the latch mechanism and the goose neck frame is provided with a rounded extremity 61 designed to rock on the flat upper surface of the main frame. The relationship of the parts and the fit of the latch mechanism with the socket is such as to allow a limited, loosely confined pivotal movement of the parts.

When the goose neck frame and the main frame are so related that the surfaces 31 and 32 are substantially in abutment, the weight or load on the main frame is transmitted to and borne by the goose neck frame through a particular linkage mechanism. The bifurcated goose neck frame at each side is provided with a stationary pin 66, referred to as a first pin, which is tapered and anchored to the structure of the goose neck frame and projects in a horizontal, forward direction therefrom. The forward end of the first pin 66 is supported by a strap 67 connected by welding 68 to the under portion of the goose neck frame arch. In this fashion, the first pin 66 is supported at both ends as a simple beam.

Designed to slide freely on the first pin 66 is a link 69 preferably formed of a contoured plate having a pair of openings 71 and 72 therethrough. The opening 71 is somewhat larger than the diameter of the pin 66 so that the link not only can slide on the pin, but can rock slightly with respect thereto in a fore and aft direction. The link 69 is held against sliding movement by a removable, C-shaped, partial collar 73. This is designed to embrace the otherwise exposed portion of the pin 66 and is captured by a flexible chain 74 secured to the strap 67. The user, by removing the collar 73 by transverse withdrawal thereof from the pin 66, can then manually slide the link 69 from a first, forward position as shown in FIGURE 6, for example, into a second, rearward position as shown in FIGURE 5. When the pin has been slid from one extreme position to the other, the collar 73 is then replaced on the pin 66 in the position just vacated by the link. When the collar is in either position, the link is immovable in an axial or fore and aft direction.

The lower opening 72 in the link 69 is designed to permit the link easily to engage the forwardly extending portion 76 of a second pin 77 projecting to a limited extent and having a conical configuration welded into position at the forward end of the main frame between reinforcing plates 78 thereon. The axis of the second pin 77 is parallel with the axis of the first pin when the goose neck frame and the main frame are connected together.

The interconnection is preferably accomplished by putting the parts into close juxtaposition and then sliding the link 69 rearwardly so that it encompasses both of the pins 66 and 77. Together with the close interconnection between the abutting surfaces 31 and 32, and the fulcrum or pivotal abutment between the rearward portion of the goose neck frame and the upper surface of the main frame, this forms a tight and workable connection of these parts. The vertical tension loads are virtually entirely transmitted by the link 69.

While the lug 37 is effective to transmit some forces in a longitudinal and transverse direction, and while the inclined surfaces 31 and 32 likewise are effective to transfer forces in both a horizontal direction and a vertical direction, it is preferred to augment these structures with special means for assisting in resisting forces in a horizontal plane. For that reason, the inclined surface 31 is interrupted with an opening 81 into which a tooth 82 depending from the surface 32 may freely enter. When the tooth is well positioned within the opening 81, it engages the various walls thereof to afford an interlock.

In the use of this structure, particularly as shown in FIGURES 1-4 inclusive, the arrangement when assembled appears as shown in FIGURE 1. When the device is to be disassembled, the fifth wheel interconnection 17 is disconnected in the usual way and the tractor 18 is driven forwardly. During this maneuver, the forward end of the goose neck frame 16 slides with respect to the inclined surfaces 24 and 26 on the tractor fifth wheel mechanism and is lowered. The forward, lower corners of the main frame lower to the ground and rest thereon. When the tractor has driven far enough forward, the parts are related substantially as illustrated in FIGURE 2 with the weight of the rearward portion of the inclined main frame borne on the ground-engaging wheels 8 and 9 and the forward lower portion of the main frame resting on the ground. The goose neck frame is cantilevered from the forward portion of the main frame.

Under these circumstances, the operator removes the collars 73 from both sides of the structure and slides the links 69 forwardly to disengage them completely from the second pins 77. The operator then places the collar 73 in rearward position to make sure that the links 69 are retained in their forward position against the straps 67. When that has been accomplished, the crank handles 51 are rotated (one in a clockwise direction as shown in FIGURE 9) to withdraw the latch bars 42. Thereupon the tractor 18 is reversed so that the inclined surface 26 again engages the underneath portion of the goose neck frame and lifts the frame onto the surface 24 and upwardly. This rotates the goose neck frame about the transverse axis adjacent the latches and lifts the goose neck frame into a position substantially as shown in FIGURE 3. This rotary lifting movement withdraws the teeth 82 from the sockets 81. When then the tractor is again driven forwardly with the fifth wheel mechanism 17 engaged with the goose neck frame, the goose neck frame is transported bodily away from the main frame substantially as shown in FIGURE 4, thus leaving the main frame inclined with its forward end in position on the ground.

In this attitude of the main frame and particularly if detachable outriggers 91 are employed thereon, it is easy to drive a tractor, power shovel or comparable piece of equipment from the ground onto the outriggers 91 and straddling the main frame. This effectuates a loading operation without the necessity of any auxiliary cribbing, loading ramps or other loading structure.

When the main frame has been so laden and it is desired again to pick up the main frame and the load, the previous sequence of operations is substantially reversed. The tractor with the goose neck frame overlies the forward end of the main frame. The interengagement of the parts is facilitated in that the connecting lugs 37 on the goose neck frame are in part guided by converging walls 92 on the main frame so that the lugs are piloted into position. Just prior to this, the crank handles 51 have been put in released position so that the latch bars 42 project. As the lugs 37 move rearwardly with respect to the main frame, the latch bars snap behind the tabs 39. The lugs 37 are thus held in place so that the goose neck frame is related transversely to the main frame in a proper fashion and so that the parts have a preliminary interconnection.

The operator then drives the tractor 18 forwardly after disconnecting the fifth wheel mechanism 17. As the detached tractor moves forward, the camming action between the goose neck frame and the surfaces 24 and 26 repeats and the forward end of the goose neck frame is lowered, thus rotating the goose neck frame with respect to the main frame about the transverse axis adjacent the lugs. This rotary movement causes the teeth 82 to re-enter the sockets 81 and drops the surfaces 32 into precise abutment with the surfaces 31. This final engaging movement is assisted and the alignment transversely of the parts is assured by the provision of inwardly and downwardly inclined cam plates 93 at the forward end of the main frame cooperating with comparable downwardly and inwardly inclined cam plates 94 on the goose neck frame. The parts are thus well aligned both transversely and longitudinally.

When the goose neck frame has been dropped, as described, the collars 73 are removed and the operator manually slides the links 69 rearwardly to engage the projecting portion 76 of the second pins 77. The relationship of the parts is such that the arcuate movement of the links 69 as the goose neck frame is lowered causes them to come to rest just ahead of the forward extension 76 of the second pins 77. It is thus easy to slide the links 69 rearwardly into their rearmost position. Following this, the collars 73 are replaced in their forward position as shown in FIGURE 5. The interconnection has been made and the tractor 18 can then again be reversed, the fifth wheel mechanism 17 reconnected and the entire detachable goose neck trailer and its load driven away in proper attitude.

What is claimed is:

1. A detachable goose neck trailer comprising an elongated main frame, ground-engaging wheels disposed under the rearward end of said main frame in supporting relationship thereto, a goose neck frame, means on said goose neck frame for engaging a support under the forward end thereof, an inclined abutting surface fixed on the top of said main frame, an inclined abutting surface fixed on the bottom of said goose neck frame, a first pin with a longitudinally extending axis on said goose neck frame, a second pin with a longitudinally extending axis on said main frame, means for locating said main frame and said goose neck frame for rocking movement with respect to each other about a transverse horizontal axis into a position with said abutting surfaces in abutment and with the axes of said pins substantially parallel, and links slidably engaging said first and said second pins.

2. A detachable goose neck trailer comprising an elongated main frame, ground-engaging wheels disposed under the rearward end of said main frame in supporting relationship thereto, means defining a downwardly and forwardly sloping upper abutting surface on the forward portion of said main frame, a goose neck frame, means on said goose neck frame for engaging a support under the forward end thereof, means forming an upwardly and rearwardly sloping lower abutting surface on the rearward portion of said goose neck frame, interengaging means on said main frame and said goose neck frame for holding said frames for rotation relative to each other about a transverse axis into and out of a position with said abutting surfaces in abutment with each other, first pins with longitudinally extending axes projecting forwardly from the rearward portion of said goose neck frame, links depending from and slidably along said first pins, and second pins with longitudinally extending axes on the forward end of said main frame engageable with said links when said sloping abutment surfaces are in abutment.

3. A detachable goose neck trailer comprising an elongated main frame, means for supporting one portion of said main frame from the ground, a goose neck frame adapted at one end to be supported from the ground, a longitudinally extending first pin on said goose neck frame, a link depending from said first pin and slidable along said first pin between a first position and a second position, a longitudinally extending second pin projecting from the forward end of said main frame in a position to be engaged by said link only when said link is in said second position, inclined surfaces on said main frame and said goose neck frame adapted to abut each other when said second pin is engaged by said link, and means on said main frame and said goose neck frame for preventing relative longitudinal movement thereof when said inclined surfaces are in abutment.

4. A detachable goose neck trailer comprising an elongated main frame, means for supporting one portion of said main frame from the ground, a goose neck frame adapted at one end to be supported from the ground, a pair of downwardly and forwardly inclined surfaces on said main frame and said goose neck frame at opposite sides thereof and adapted to abut each other, a pair of parallel longitudinally extending first pins on said goose neck frame at opposite sides thereof, a pair of links slidably on and depending from said first pins and respectively slidable longitudinally thereon between a first forward position and a second rearward position, a pair of parallel longitudinally extending second pins projecting forwardly from the forward end of said main frame only far enough to be engaged by said links when said surfaces are in abutment and said links are in said second rearward position, means on said main frame and said goose neck frame for holding said frames for rotation relative to each other about a transverse axis, and means on said main frame and said goose neck frame for restraining said frames against longitudinal and transverse movement relative to each other.

References Cited
UNITED STATES PATENTS 2,952,476    9/1960    Brockman _____ 280—423
3,027,030    3/1962    Duffy _____ 280—423

LEO FRIAGLIA, *Primary Examiner.*